Oct. 16, 1945.  M. KATZMAN  2,387,156
ELECTRIC VAPORIZER
Filed April 28, 1943
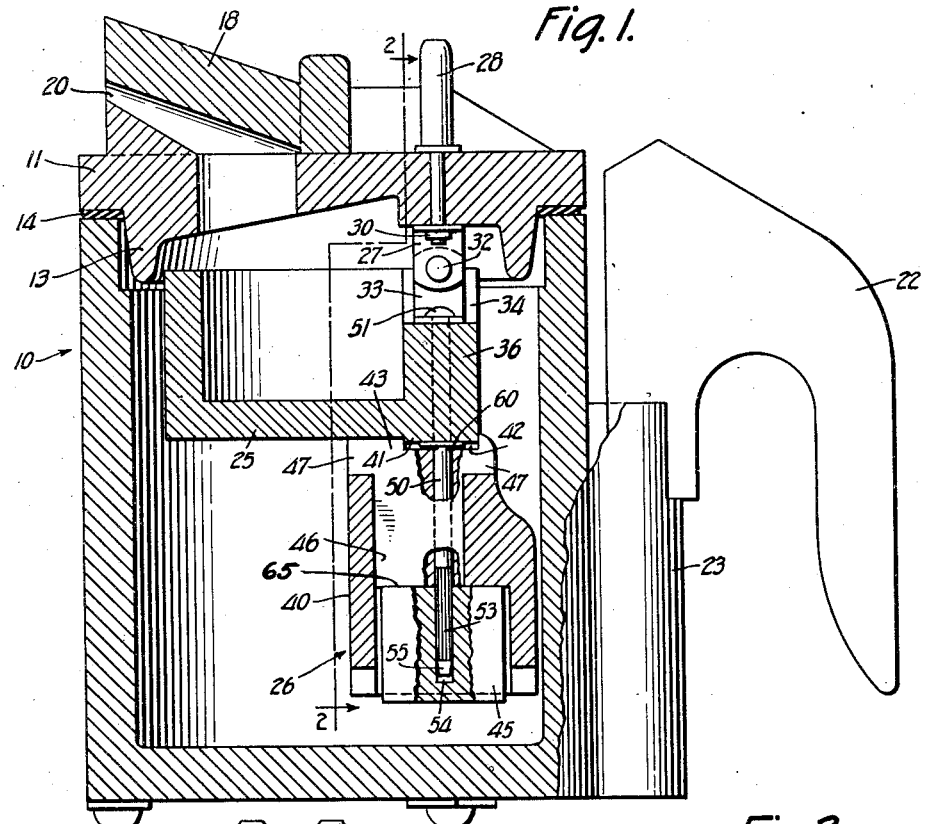
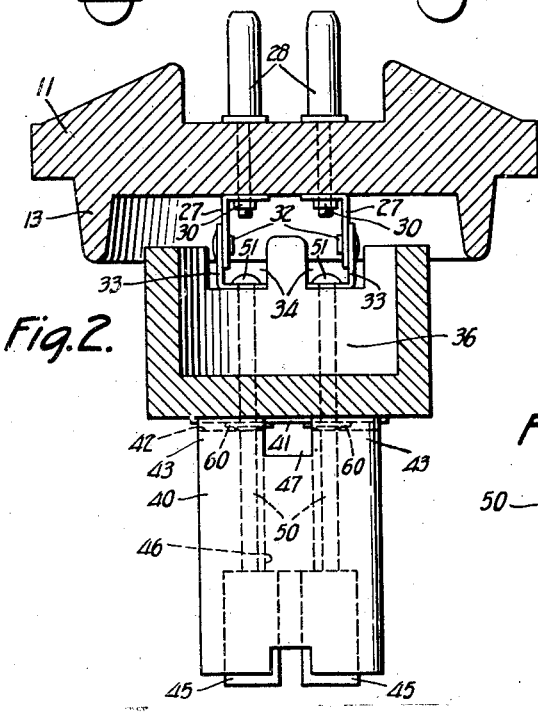
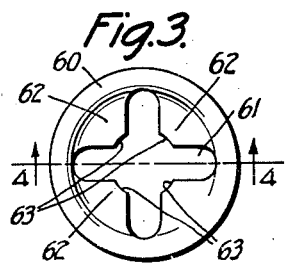
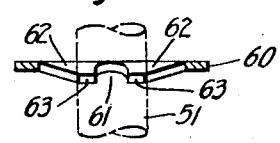
INVENTOR.
Max Katzman
BY Moser + Nolte
ATTORNEYS Patented Oct. 16, 1945

2,387,156

UNITED STATES PATENT OFFICE 2,387,156

ELECTRIC VAPORIZER

Max Katzman, Brooklyn, N. Y.

Application April 28, 1943, Serial No. 484,849

4 Claims. (Cl. 219—40)

The present invention relates to electric vaporizers of the type employed to vaporize liquid and to liberate the vapors within a room or other confined space. Although the vaporizer of the present invention has a wide range of utility, it is particularly adapted to vaporize medicated liquids for inhalation in the treatment of respiratory ailments or to vaporize deodorant or disinfectant liquids.

In electric vaporizers of the general type referred to, there is provided a jar adapted to contain the liquid to be vaporized, a removable lid for said jar, an electric heater, depending from the underside of said lid, having suitable electrodes to be submerged in the jar liquid, and terminals for said heater secured to the upper side of the lid for connection to an electric plug.

Among the objects of the present invention is to support the electric heater from a vaporizer lid by a simple and effective device requiring a minimum of manipulation to assemble and attach, and affording not only a strong rigid support for the heater, but also a highly effective conductor for the electrodes of said heater.

Various other objects of the invention will be apparent from the following particular description, and from an inspection of the accompanying drawing, in which Fig. 1 is a view partly in vertical section and partly in side elevation of a vaporizer embodying the present invention;

Fig. 2 is a vertical section taken on line 2—2 of Fig. 1;

Fig. 3 is a top plan view of a lock washer forming part of the heater supporting means of the present invention;

Fig. 4 is a section of the clamping washer taken on line 4—4 of Fig. 3; and

Fig. 5 is a transverse section of the fastening pin forming part of the heater supporting means of the present invention.

Referring to the drawings, the electric vaporizer of the present invention comprises a jar 10 open at the top and made of any suitable insulating material such as porcelain. The open top of the jar 10 is closed by a cover or lid 11 which is also desirably made of porcelain, but which can be made of any other suitable material. This lid 11 seats freely on the top rim of the jar 10 and is provided on its underside with a rib or flange 13 embraced by a gasket 14 serving as a packing for the joint between the jar 10 and the lid 11.

A vapor discharge nozzle 18 on the upper side of the lid 11 is provided with an inclined opening 20 communicating with the interior of the jar 10 and tapering to discharge vapor at high speed. The nozzle 18 may be formed, for example, in a manner described in my copending application Serial No. 484,848 filed April 28, 1943.

A handle 22 is seated on a support 23 projecting integrally from the side of the jar 10 and may be secured to said support by a bolt (not shown) in a manner for example, as shown in the aforesaid copending application.

Suspended from the lid 11 and forming a unitary assembly therewith is a cup or receptacle 25 and a heater 26. The receptacle 25 which is of suitable insulating material such as porcelain, is adapted to contain respiratory medicant, deodorant, antiseptic or other ingredients to be ejected with the steam vapors generated in the vaporizer, and serves to keep these ingredients away from the heater 26 and the carrier liquid to be vaporized, as set forth in my United States Patent No. 2,051,719, issued August 18, 1936. This receptacle 25 is hingedly fastened to the underside of the lid 11 by means comprising a pair of metal hangers 27 in the form of angles secured to the underside of said lid by terminal pins 28. These terminal pins 28 project upwardly beyond the upper side of the lid 11 to removably receive a conventional electric plug and are clamped in position by screwing their lower ends into threaded portions 30 on the hangers 27. These hangers 27 have respective depending flanges pivotally connected at 32 to the upstanding flanges of metal angle brackets 33, which are retained in recesses 34 of the receptacle 25, and which are fixed to said receptacle in a novel and improved manner to be described.

The receptacle 25 is of cylindrical shape except for a flat chordal rear side 36, which is desirably of increased thickness to mount conveniently the hinge members 27 and 33, and to receive the fastening pins 50 to be described.

The electric heating unit 26 includes a tubular frame 40 of suitable insulating material such as porcelain, shown of substantially rectangular cross-section and held against the underside of the receptacle 25 in a manner to be described. This heater frame 40 is held against rotation by a boss 41 on the underside of the receptacle 25 extending into recesses 42 formed in the upper side walls 43 of said frame.

Two heating electrodes 45 of carbon, steel or other suitable highly conductive material and shown of rectangular block form, are in the hollow 46 of the heater frame 40 and are interspaced to permit flow of liquid or vapor upwardly into said frame hollow. A transverse opening 47 in the heater frame 40 extending across the full width of the frame at the top communicates with its central hollow 46 to form a circulatory passageway for the carrier liquid or vapors as set forth in my Patent No. 2,051,719.

As a feature of the present invention, the electrodes 45 are fastened to the heater frame 40 by means of two metal pins 50 which are formed at their upper ends with heads 51 bearing against the base flanges of the hinge brackets 33 to secure said brackets to the receptacle 25, and which extend through the frame walls 43 of the heater for attachment to respective electrodes. These pins 50 serve not only as fastening means for the heater 26, but also serve to conduct electricity to the electrodes 45.

For frictionally, firmly and economically attaching the lower ends of the pins 50 to respective electrodes 45, the lower pin sections 53 are roughened desirably by providing said sections with longitudinally extending corrugations formed as for example by a suitable knurling tool. The electrodes 45 are formed with holes 54 which extend only partially thereinto, and which have a press-fit with the knurled pin sections 53. The extreme end sections 55 of the pins 50 are desirably smooth and tapered to facilitate entry of said pins into the electrode holes 54, and also the slipping of the clamp or lock washers 60 thereon as will be more fully described.

To prevent longitudinal play in the pins 50, there are provided the lock friction washers 60 each having a cross-shaped slot or cut-out 61 defining four quadrantly arranged spring-prongs 62 with inner edges 63 curved along a common circle. The diameter of this edge circle is smaller than the diameter of the smooth section of the corresponding pin 50, so that as the washer 60 is slid along its respective pin, the prongs 62 will be flexed downwardly as shown. These washers 60 are held in the recesses 42 of the heater frame 40 in concealed position, and are clamped against the underside of the receptacle 25 with the prongs 62 flexed downwardly and biting into the periphery of the pins 50. In this clamping position, the washers 60 are locked on the pins 50 and cannot slide back therealong, since any return movement of said washers causes the prongs 62 thereof to dig more deeply into the pins 50.

The lower sections of the tubular heater frame 40 are recessed to receive the electrodes 45, and also to define shoulders 65 on said frame, so that said frame through said shoulders seats on said electrodes, while said electrodes are suspended from the lid 11 by the pins 50.

In the assembly of the heater 26, after the pins 50 have been slipped through the receptacle wall 36, the washers 60 are slipped over said pins until they bear against the underside of the receptacle 25. The heater frame 40 is then slipped over the pins 50 until said frame abuts the underside of the receptacle 25. In this position, while the lower knurled sections 53 of the pins 50 project below the heater frame walls 43, the electrodes 51 are pressed fitted over these knurled pin sections so that a firm frictional engagement of these electrodes with said pins is effected. The washers 60 serve not only to prevent longitudinal play of the pins 50 during use, but also serve to lock these pins against longitudinal movement while the electrodes 45 are being press-fitted over said pins.

It is seen that the heater 26 is firmly attached to the receptacle 25 in an easy and expeditious manner by a device requiring very little manipulation or operation, thereby materially reducing cost of manufacture. Furthermore, this device permits easy separation of the heater parts for the purpose of replacement or repair of these parts.

I have described what I believe to be the best embodiments of my invention. I do not wish, however, to be confined to the embodiments shown, but what I desire to secure by Letters Patent is set forth in the appended claims.

I claim:

1. In an electric vaporizer, a lid, a receptacle suspended from said lid, an electric heater, and means for supporting said heater from said receptacle and comprising an upright metal fastening pin in the circuit of said heater anchored at its upper end to said receptacle and secured at its lower section with a friction fit to said heater.

2. In an electric vaporizer, a lid, a receptacle suspended from said lid, an electric heater comprising a pair of spaced electrodes, and a frame for said heater seated on said electrodes between said lid and said electrodes, and means for suspending said electrodes from and below said receptacle and comprising upright pins in the circuit of said electrodes anchored at their upper ends to said receptacle and having their lower ends in frictional press fit engagement with said electrodes.

3. In an electric vaporizer, a lid, a receptacle suspended from said lid, an electric heater comprising a pair of spaced electrodes, and a frame for said heater seated on said electrodes between said lid and said electrodes, and means for suspending said electrodes from and below said receptacle and comprising upright pins in the circuit of said electrodes anchored at their upper ends to said receptacle and having their lower ends in frictional press-fit engagement with said electrodes, and washers on said pins respectively clamped against the underside of said receptacle and frictionally retained on said pins against slippage along said pins.

4. In an electric vaporizer, a lid, a receptacle suspended from said lid, an electric heater comprising a pair of spaced electrodes, and a frame for said heater seated on said electrodes between said lid and said electrodes, and means for suspending said electrodes from and below said receptacle and comprising upright pins in the circuit of said electrodes having heads at their upper ends seated on shoulders presented by said receptacle for anchoring said pins against downward movement, and having their lower ends roughened and in frictional press-fit engagement with said electrodes and washers on said pins respectively clamped against the underside of said receptacle and frictionally retained on said pins against slippage along said pins.

MAX KATZMAN.